US009117000B2

(12) United States Patent
Cok et al.

(10) Patent No.: US 9,117,000 B2
(45) Date of Patent: *Aug. 25, 2015

(54) INFORMATION RETRIEVAL USING DECODED MACHINE-READABLE OPTICAL CODES

(71) Applicant: Intellectual Ventures Fund 83 LLC, Las Vegas, NV (US)

(72) Inventors: Ronald Steven Cok, Rochester, NY (US); Dustin Lee Winters, Webster, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/108,755

(22) Filed: Dec. 17, 2013

(65) Prior Publication Data

US 2014/0103107 A1    Apr. 17, 2014

Related U.S. Application Data

(63) Continuation of application No. 13/206,013, filed on Aug. 9, 2011, now Pat. No. 8,632,013.

(51) Int. Cl.
G06K 7/10    (2006.01)
G06F 17/30   (2006.01)

(52) U.S. Cl.
CPC .............................. *G06F 17/30879* (2013.01)

(58) Field of Classification Search
USPC ........................................................ 235/454
See application file for complete search history.

(56) References Cited

U.S. PATENT DOCUMENTS

| 5,134,272 | A | * | 7/1992 | Tsuchiya et al. ......... 235/462.08 |
| 5,821,523 | A |   | 10/1998 | Bunte et al. |
| 5,978,773 | A |   | 11/1999 | Hudetz et al. |
| 5,979,757 | A |   | 11/1999 | Tracy et al. |
| 6,003,773 | A |   | 12/1999 | Durbin et al. |
| 6,199,048 | B1 |   | 3/2001 | Hudetz et al. |
| 6,321,992 | B1 |   | 11/2001 | Knowles et al. |
| 6,494,375 | B1 |   | 12/2002 | Ishibashi et al. |
| 6,751,352 | B1 | * | 6/2004 | Baharav et al. ............... 382/183 |
| 8,144,361 | B2 | * | 3/2012 | Ming et al. .................... 358/1.18 |
| 2004/0086182 | A1 | * | 5/2004 | Bian et al. ..................... 382/183 |
| 2011/0085198 | A1 | * | 4/2011 | Son et al. ..................... 358/1.15 |
| 2013/0094695 | A1 | * | 4/2013 | He et al. ....................... 382/103 |

OTHER PUBLICATIONS

Jeremy Logan, "On-Screen barcode & QRCode Decoder," http://www.fixedd.com/projectsdecode_from_screen Aug. 2, 2011, 1 page.
Non-Final Office Action on U.S. Appl. No. 13/206,013, mailed Dec. 21, 2012.
Notice of Allowance on U.S. Appl. No. 13/206,013, mailed Apr. 29, 2013.
Notice of Allowance on U.S. Appl. No. 13/206,013, mailed Sep. 12, 2013.

* cited by examiner

*Primary Examiner* — Jamara Franklin (57) ABSTRACT

A method is disclosed for reading a machine-readable optical code encoding information formed in an image that is presented to a user. The method includes using a processor to receive the image with the machine-readable optical code; using a graphic user interface to visually present the received image on a display; using the graphic user interface to receive a user selection of the machine-readable optical code; using a processor to decode the selected machine-readable optical code; and using the graphic user interface to present information referenced by the decoded information on the display.

20 Claims, 7 Drawing Sheets

FIG. 1

```
<html>
    <head>
        <title>Test 1</title>
    </head>

<body>

<img src="camera.gif"/>

<table>
            <tr><th>
                <p>The Vest Pocket Autographic Kodak
                <p><small>with Kodak Anastigmat Lens</small></br>
            </th><th>
                <img src="KodakQRCode.png" height="100" width="100" border="0" align="top"/></br>
            </th>
            </tr>
        </table>

</body>
</html>
```

FIG. 2A

```
<html>
    <head>
        <title>Test 1</title>
    </head>

<body>

<img src="camera.gif"/>

<table>
            <tr><th>
            <p>The Vest Pocket Autographic Kodak
            <p><small>with Kodak Anastigmat Lens</small></br>
            </th><th>
            <a href="http://www.kodak.com"><img src="KodakQRCode.png" height="100" width="100" border="0" align="top"/></a></br>
            </th>
            </tr>
        </table>

</body>
</html>
```

```
<html>
    <head>
        <title>Test2</title>
    </head>

<body>

<img src="CameraWithQRcode.gif" width="625" height="545" border = "0" />

</body>
</html>
```

FIG. 4A

```
<html>
    <head>
        <title>Test2</title>
    </head>

<body>

<img src="CameraWithQRcode.gif" width="625" height="545" border="0" usemap="#BarCodeMap" />

<map name="BarCodeMap">

<area shape="rect" coords="515,452,613,538" href="http://www.kodak.com" alt="http://www.kodak.com"/>

</map>

</body>
</html>
```

INFORMATION RETRIEVAL USING DECODED MACHINE-READABLE OPTICAL CODES

CROSS-REFERENCE TO RELATED PATENT APPLICATIONS

This application is a Continuation of U.S. patent application Ser. No. 13/206,013, filed Aug. 9, 2011, incorporated herein by reference in its entirety.

FIELD

The present disclosure relates to retrieving information from digital images having machine-readable optical codes.

BACKGROUND

Barcodes printed on the surface of product packages, posters, signs, bill boards, and the like have enabled consumers to find additional information about various products and services. For example, a consumer can now take a digital photograph of a barcode with, for example, a digital-camera-equipped cellular telephone, personal digital assistant (PDA), or mobile tablet computing device. These devices, in additional to having a camera, typically also have a network connection, for example by way of a wireless (802.11) connection or cellular network connection, to connect to the internet. Having captured an image of a sign or product having a barcode, software applications in the device are currently available to extract and decode the barcode, connect to the internet, retrieve additional information related to the barcode, and display the information to the consumer.

This capability can be performed using many different types of common barcode formats, such as Universal Product Code (UPC) barcodes or Code 39 type barcodes which are one-dimensional (1D) bar code. A problem with 1D barcodes is that such barcodes can only store limited amounts of data. Some computer network addresses on the internet, in the form of a Uniform Resource Locator (URL) can be over 100 characters long. One solution to this problem as described in U.S. Pat. Nos. 5,978,773 and 6,199,048 is to provide a remote networked database to convert barcode values into URL strings. However, this approach requires a remote database and limits the number of possible URLs to the number of available 1D barcodes. More recently, two dimensional bar (2D) codes have become more widely used. For example, Quick Response codes (QR Codes) have become a popular barcode format for this purpose due to their ability to store large strings of data in a two-dimensional array. A QR barcode reading system is described in U.S. Pat. No. 6,494,375.

Users can also encounter barcodes when viewing electronic documents. For example, an image of a barcode or of an item having a printed barcode can be embedded in an electronic document, such as a Portable Document Format (PDF) file, a web page document encoded into hypertext markup language (HTML) or the like. A user wishing to retrieve information about the barcode can print the electronic document to a hardcopy output, for example by using an inkjet printer. The user can then capture an image of the printout using a camera device as described above and retrieve information over a communication network. Alternately, the user can capture an image with the camera device of the electronic document as displayed on an electronic monitor. These methods require the user to have access to a camera device. An improved method of retrieving information about the barcode present in an electronic document is therefore needed.

SUMMARY

The present disclosure provides a method for reading a machine-readable optical code encoding information formed in an image that is presented to a user, comprising:
(a) using a processor to receive the image with the machine-readable optical code;
(b) using a graphic user interface to visually present the received image on a display;
(c) using the graphic user interface to receive a user selection of the machine-readable optical code;
(d) using a processor to decode the selected machine-readable optical code; and
(e) using the graphic user interface to present information referenced by the decoded information on the display.

The present disclosure provides the advantage that information referenced by images that include machine-readable optical codes can be presented to a user at the user's discretion. Furthermore, information referenced by images scanned from hard copy, for example prints on photographic paper, can be accessed. In contrast to methods of the prior art, the present disclosure provides a way for users to access information referenced by machine-readable optical codes within a stored digital image and accessible through a browser. Since browsers are ubiquitous tools for accessing information on the internet, such accessibility is a useful feature of the present disclosure.

DETAILED DESCRIPTION OF THE PREFERRED EMBODIMENTS

Figure 1:
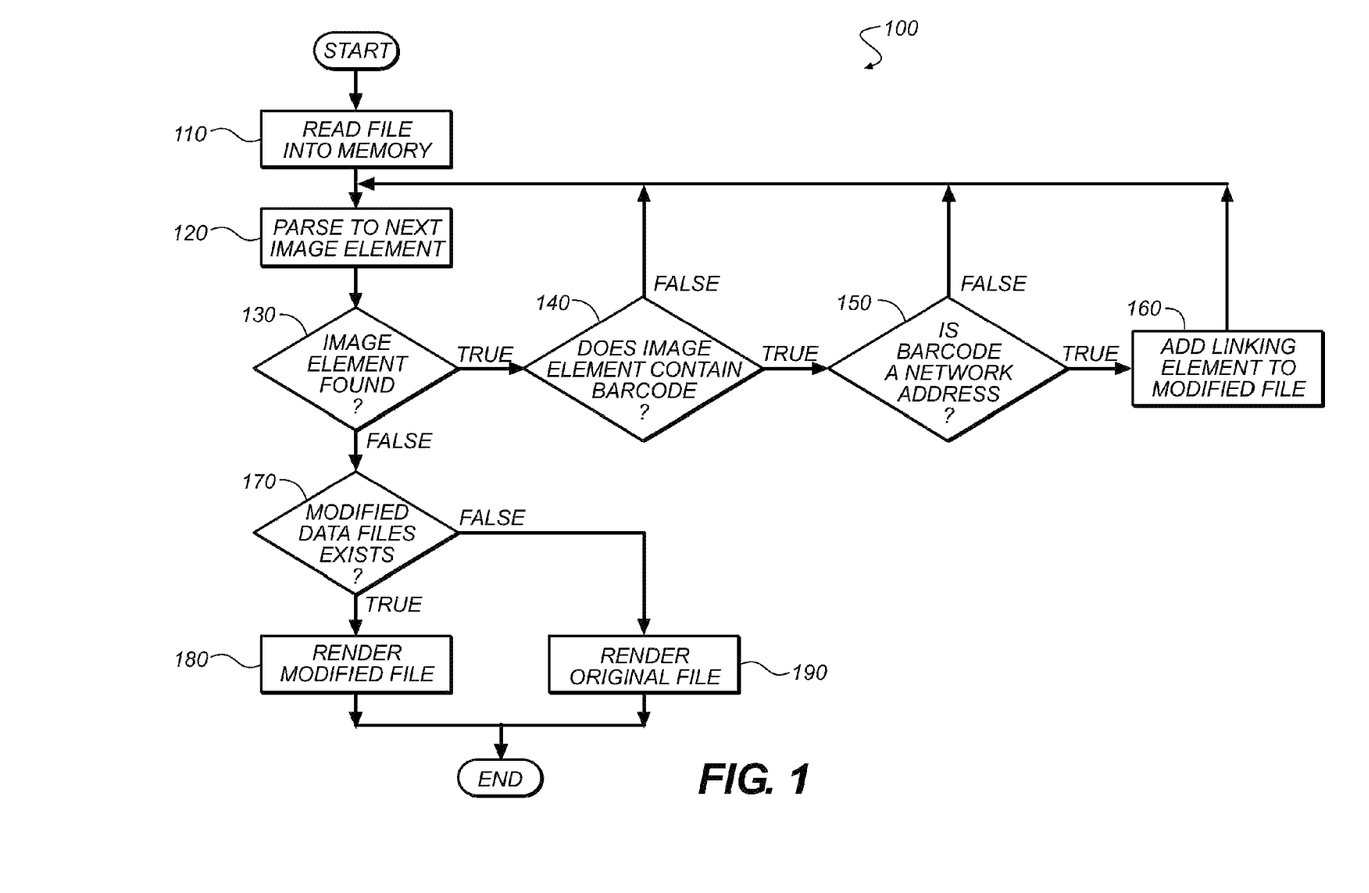
FIG. 1 is a flow chart illustrating a process for rendering an electronic document according to the present disclosure.
Figure 2A:
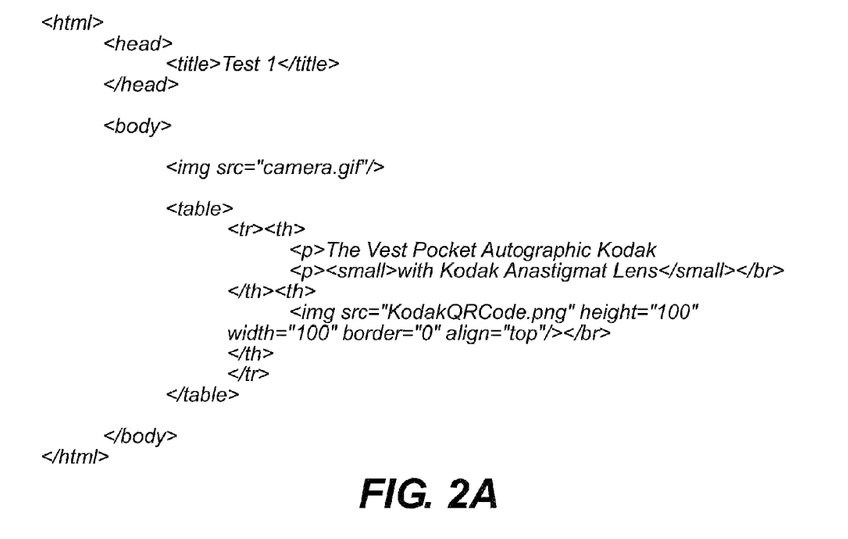
FIGS. 2A and 2B illustrate an electronic HTML document and an electronic HTML document modified according to the present disclosure, respectively.

A first embodiment of the present disclosure will now be described with reference to FIG. 1, FIG. 2A, FIG. 2B, and FIG. 3. FIG. 2A illustrates an electronic document entitled "Test1.html" in the form of its HTML encoding. The HTML encoding contains reference to two image files; "camera.gif" and "KodakQRCode.png" which also make up the electronic document. The "KodakQRCode.png" file contains an image of a machine-readable optical code in the form of a QR-code-type barcode that can be optically read by a machine such as a digital scanner or digital camera. The HTML code of the "Test1.html" electronic document can be rendered on a display device, such as an LCD display monitor or screen, using any suitable web browser software including, for example, Mozilla's Firefox, Apple Inc.'s Safari, or Microsoft Corporation's Internet Explorer software.

According to the first embodiment, additional modifications are performed to render the electronic document. Turning to FIG. 1, process 100 for rendering the electronic document will now be described. Process 100 is preferably executed by way of a software instruction set. This software instruction set can be part of, or an extension to, a viewer or browser program. Alternately, this software instruction set can be executed, at least in part, prior to execution of the viewer or browser program as described in further detail below. Process 100 begins with step 110, where the "Test1.html" electronic document file is loaded into memory. This is done, for example, by downloading "Test1.html" from a remote server via a network, such as the internet, and storing it in either a local Random Access Memory (RAM) or cache memory on a magnetic storage drive or FLASH memory drive or the like.

Process 100 continues with step 120 wherein the electronic document is parsed until an image element is found. A series of decision blocks are then executed, beginning with decision block 130. In decision block 130, if no image element is found by parsing, process 100 continues to decision block 170. If an image element is found, process 100 then executes decision block 140. In decision block 140, the found image element is analyzed to determine if it contains a barcode or other machine-readable code. The image element can be a barcode or other machine-readable code. Alternatively, the image element can include a scene with a barcode or other machine-readable code adjacent to the scene. In yet another embodiment, the image element can include a scene in which the barcode or other machine-readable code is incorporated. Software instructions for performing this analysis can be selected from those currently known in the art for different types of barcode types. If the image element is found to not contain a barcode or other machine-readable code, process 100 loops back to step 120. If a barcode or other machine-readable code is found, process 100 proceeds to decision block 150. In decision block 150, the barcode or other machine-readable code is decoded. The decoded result is then analyzed to determine if it contains a reference to a network address. For example, a decoded result containing an "http://" contains a uniform resource locator (URL) for a network address. If no reference to a network address is determined, process 100 loops back to step 120.

If a reference to a network address is found in the decoded result, process 100 proceeds with step 160. In step 160, a modification is made to the electronic document and the modified electronic document is saved in a local memory (RAM or cache). Preferably, the modified electronic document is saved in addition to the original electronic document such that either can be retrieved if desired. In cases where memory space is limited, the modified electronic document can instead be made to replace the original electronic document. The modification includes adding a linking element to the electronic element, the linking element referencing the network address found in the barcode or machine readable code. The linking element enables a user viewing the electronic document in a graphic user interface viewer or browser program to navigate to the network address and retrieve additional information from the network address. Additional information is then downloaded from the referenced network address and presented in the graphic user interface for viewing and/or interaction with the user. For example, the browser interface program will display a webpage loaded from the linked network address. The linking element is constructed such that, when rendered in a user interface, the rendered linking element is disposed over, around, or adjacent the rendered image element which contained the barcode or machine readable code having the network address reference. If an image element is not found in step 130, then the existence of a modified data file is tested in step 170. If no such file exists, the original file is rendered in step 190. If a modified data file exists, the modified file is rendered in step 180.

In the example of "Test1.html" shown in FIG. 2A, the parser will read the file into memory at step 110. The parser examines the file per step 120 and per decision block 130 will then identify the following line as having an image element:
<img src="camera.gif">

In this case, "img src" was used to determine that an image element was present. Known file extensions of image data such as for example ".gif", ".tif", or ".jpg" can also be used to identify image elements. It should be noted that for purposes of this disclosure, the image elements are considered part of the electronic document even if their data is incorporated only by reference to another file, as is the case here. Such referenced image elements are also loaded into memory for later analysis of their pixel data. Proceeding to decision block 140, it will be determined by analysis of the pixels of camera.gif that no barcode is present. This causes the process to loop back to step 120 and continue to parse the file. The process will then continue per decision block 130 to identifying the following codes as having an image element:
<img src="KodakQRCode.png" height="100" width="100" border="0" align="top"/>

Figure 2B:
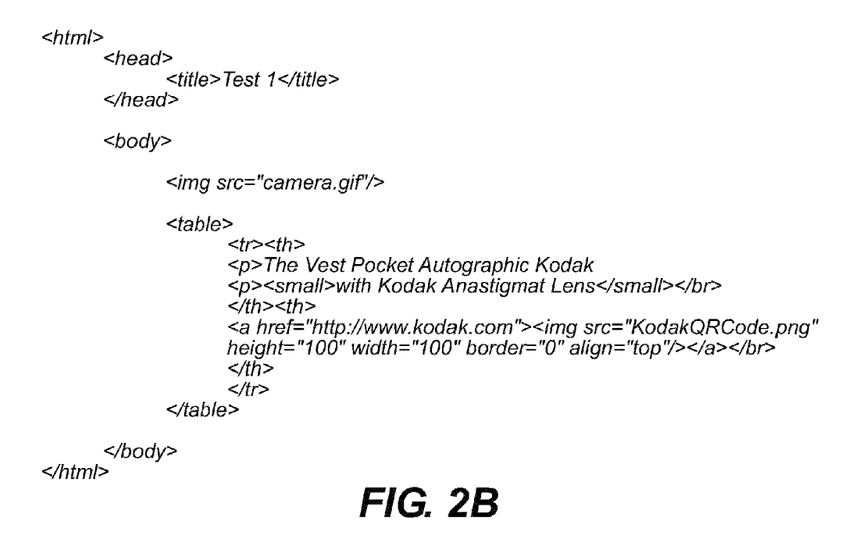

Proceeding to decision block 140, it is determined by analysis of "KodakQRCode.png" that a barcode, in this case a QR code, is present. The process then proceeds with decision block 150 where the bar code is decoded and determined to contain a reference to "http://www.kodak.com" which is a reference in URL format to a network address. Proceeding to step 160, a modification to the file is made to add a linking element. The modified file is shown in FIG. 2B. The linking element includes the HTML tag pair <a href="http://www.kodak.com"> and </a>. The modified file is then saved in memory. The process loops back to step 120, however, no further image elements are found per decision block 130, so that decision block 170 is subsequently executed. Since a modified data file exists, it is rendered per step 180 instead of the original file which would otherwise be rendered in step 190.

Figure 3:
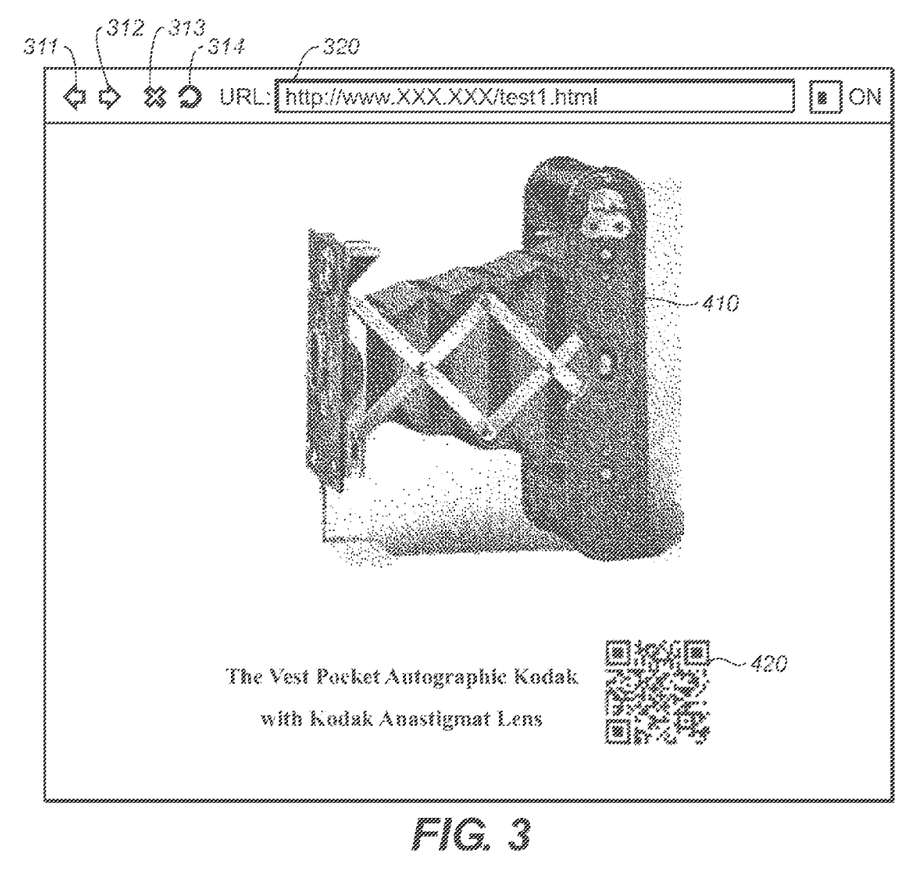
FIG. 3 illustrates a web browser graphic user interface window for rendering the electronic document.

The rendered output of the modified "Test1.html" HTML file is shown in FIG. 3. FIG. 3 illustrates a web browser graphical user interface (GUI) window having controls including an address input box 320, a navigate back button 311, a navigate forward button 312, a cancel document load button 313, and a refresh document button 314. The rendering of the "Test1.html" HTML file is shown as rendering 400. Rendering 400 is composed of rendered image 410 of "camera.gif" and rendered image 420 of "Kodak QRCode.png". As can be seen in the figure, a rendered image 420 is a machine-readable optical code (or barcode) in the form of the QR Code type. The modification of the "Test1.html" HTML file to add a linking element to rendered image 420 results in rendered image 420 becoming hyperlinked. Thus, it can be activated by, for example, selecting image element to cause the web browser window to navigate to the network address connected to "http://www.kodak.com", download the webpage associated with that address (for example an index.html file), and visually render the destination web page in the web browser window.

The modified file generated in step 160 provides the linking element so as to be located over or proximate to the rendered image 420 of the QR Code. Specifically in this example, the linking element is superimposed with the rendered image 420 such that selecting in the area of rendered image 420 activates navigation to the network address. In contrast, selecting other image elements and text elements that are not hyperlinked by way of the modification or selecting other regions of the rendered file does not result in a navigation action. Selection of or in an area can be performed by activating a control in a user interface device, for example a touch interface tap or a mouse button click when the mouse location indicator is located in the area in a graphic user interface. Such controls and devices are well known in the computing arts.

Alternate linking elements can also be practiced by one skilled in the art. For example, a modification to the file to include a hyperlinked text block either preceding or following the "Kodak QRCode.png" image element can be employed to also achieve the desired effect. An example of such an alternate linking element is:

<a href="http://www.kodak.com">www.kodak.com</a>

In a second embodiment of the present disclosure, the image linking element can result in only a portion or multiple portions of the image element becoming hyperlinked. For example, an image element might contain a barcode disposed in only a small portion of the image. Such an image, for example, can be an advertisement where a QR code is present in the lower right corner of the image, the image being captured by a user with a digital camera. In this example of the second alternate embodiment, only the lower right corner of the image will be made to be linked to the network address. Thus, in an embodiment, the hyperlinked area can be limited to the area in the image in which the barcode appears so that the barcode is visually and spatially associated with the hyperlink.

Figure 4A:
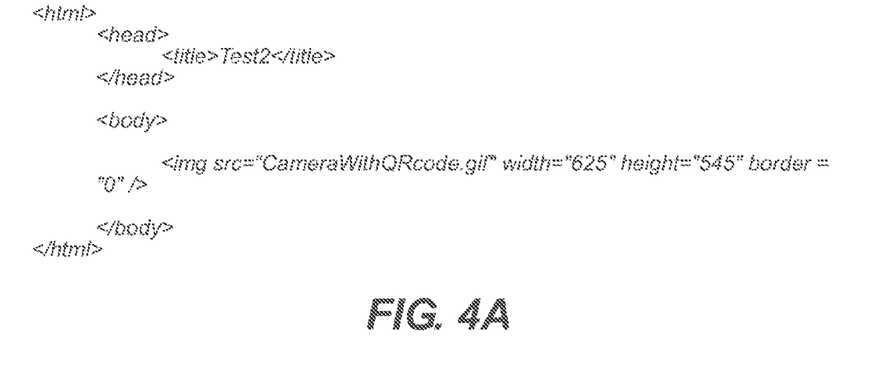
FIGS. 4A and 4B illustrate an electronic HTML document and an electronic HTML document modified according to a second embodiment of the present disclosure, respectively.
Figure 4B:
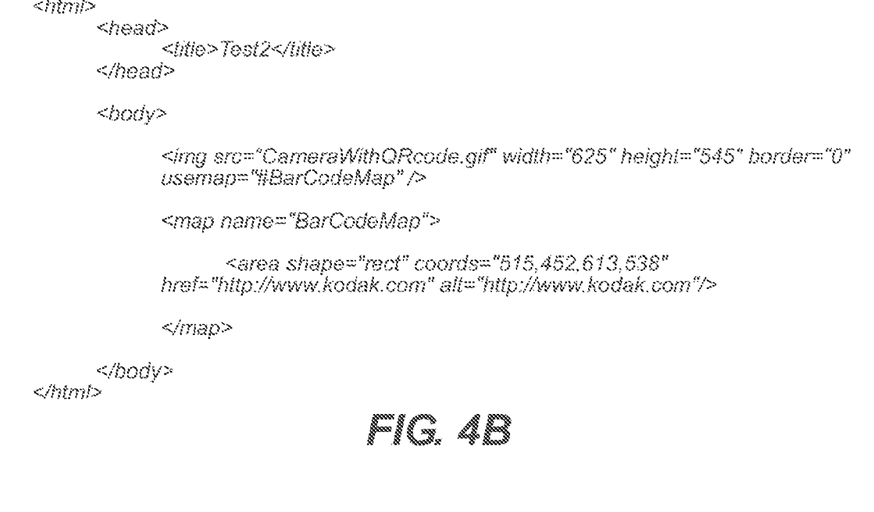
Figure 5:
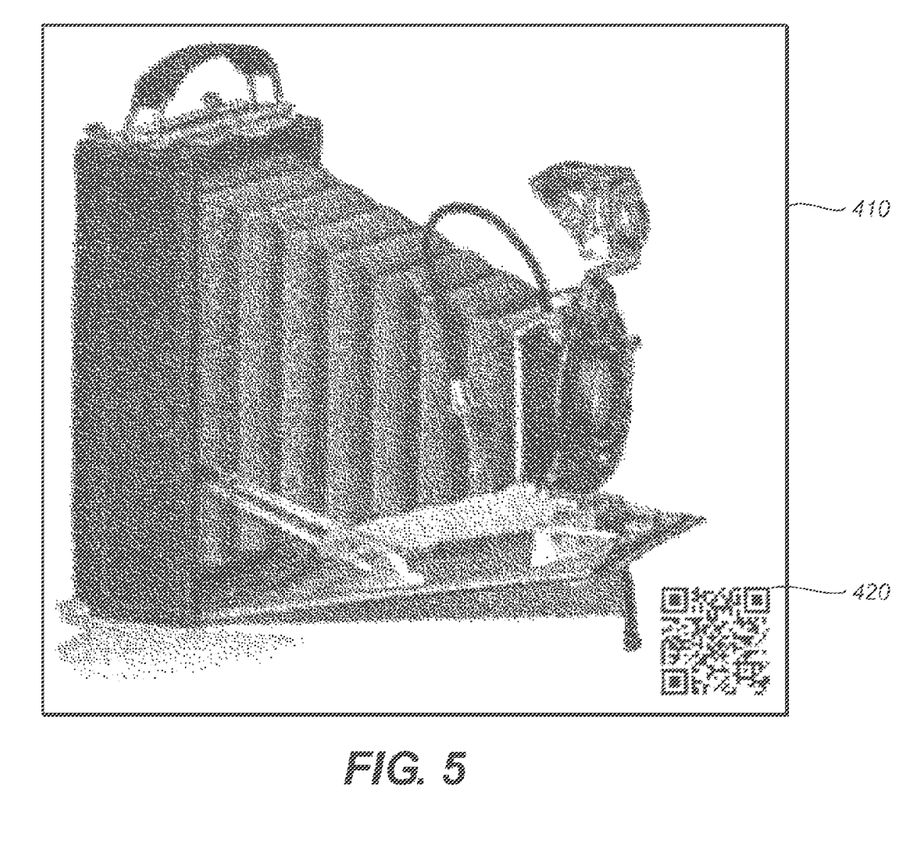
FIG. 5 illustrates an exemplary image element containing a bar code for use in describing the second embodiment of the present disclosure.

An example of an electronic document entitled "Test2.html" is shown in FIG. 4A for purpose of illustrating the second embodiment. "Test2.html" contains only a single image element named "CameraWithQRcode.gif" which is to be rendered at a width of 625 pixels and a height of 545 pixels. "CameraWithQRcode.gif", shown in FIG. 5, is an image of a camera with a QR code disposed in the lower right-hand region of the image as described above. Process 100 is performed using the "Test2.html" document and a modified electronic document is produced. The modified electronic document is shown in FIG. 4B. As seen in FIG. 4B, an image-linking element in the form of a <map> tag has been added which renders a rectangular portion of the "CameraWithQRcode.gif" image element in the pixel region from coordinates (515,452) to (613, 538) as hyperlinked to http://www.kodak.com. Upon selection by, for example, a touch screen tap or mouse click on this region of the image, the browser program will navigate to that network address. For other image elements containing a plurality of barcodes, multiple "area" elements can be added to the "map" element of the modified output html document to separately hyperlink each bar code. Therefore, in an embodiment of the present disclosure, an image can include a plurality of information-encoding barcodes.

The above examples have been described with respect to HTML-type electronic documents, however, the present disclosure can also be applied to other types of electronic documents. For example, the present disclosure can also be applied to Portable Document Format (.pdf) files, word processing documents, presentation documents, and the like.

Figure 6:
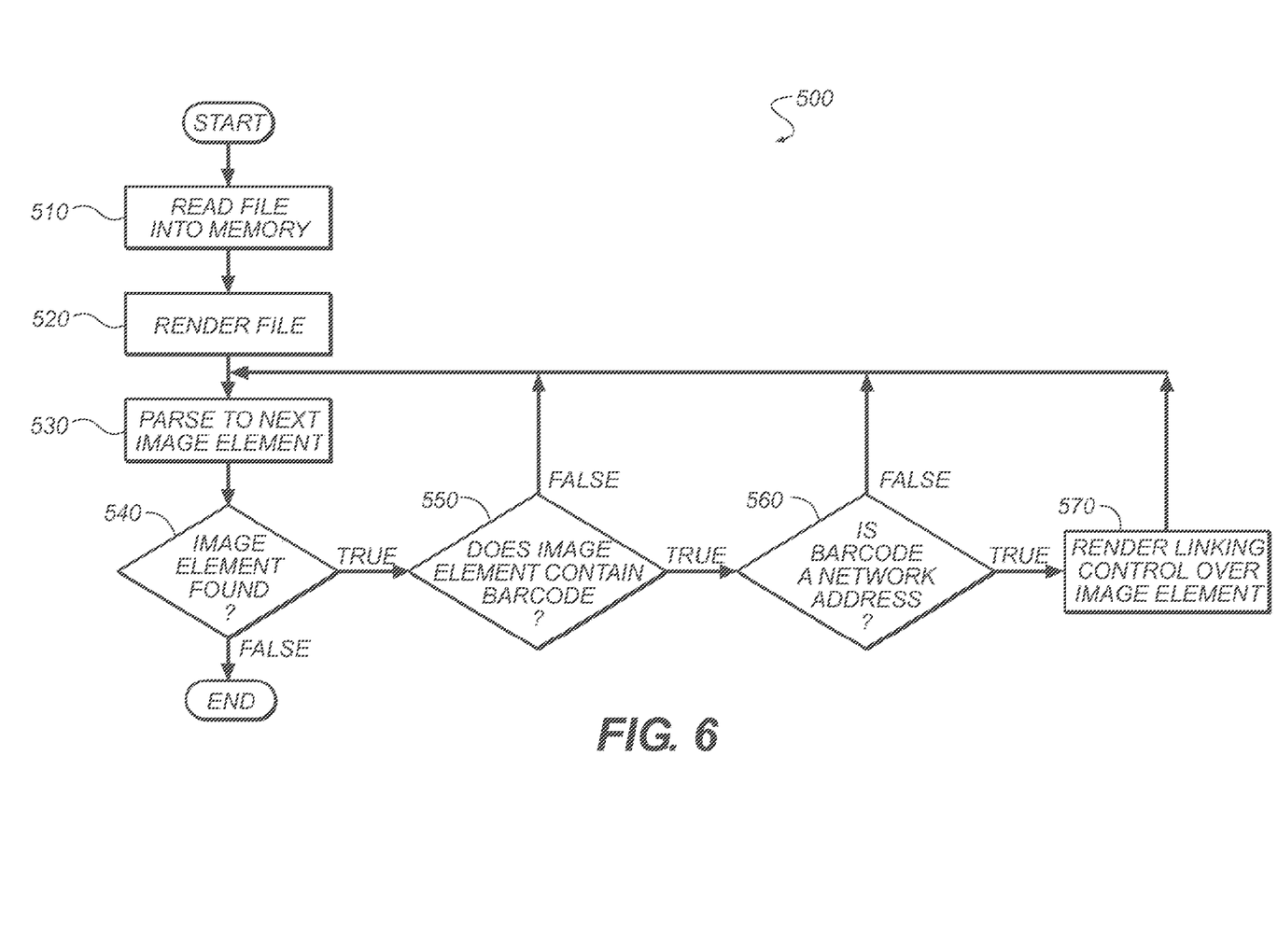
FIG. 6 is a flow chart illustrating a process for rendering an electronic document according to a third embodiment of the present disclosure.

A third embodiment of the present disclosure will now be described with reference to FIG. 6. FIG. 6 shows process 500 for rendering an electronic document. Process 500 is preferably executed by way of a software instruction set by a processor and can be stored in an electronic memory. This software instruction set can be part of, or an extension to, a viewer or browser program. Process 500 begins with step 510, where an electronic document file is loaded into memory as was described previously with respect to the first embodiment. Process 500 proceeds with step 520 where the electronic document file is rendered on the user's electronic display. Process 500 then proceeds with step 530 where the electronic document is parsed for image elements. If no image elements are found per decision block 540, then the process ends. If an image element is found, process 500 proceeds to decision block 550, where the pixels of the image element are analyzed for any barcode or other machine-readable codes. If no bar code or other machine-readable code is found in the current image element, process 500 loops back to step 530 and parses to the next image element. If a barcode or other machine-readable code is found, then process 500 proceeds to decision block 560. In decision block 560, the barcode or other machine-readable code is decoded. The decoded result is then analyzed to determine if it contains a reference to a network address. If no reference to a network address is determined, process 500 loops back to step 530, however, if a reference to a network address is found in the decoded result, process 500 proceeds with step 570. In step 570, a linking control is rendered over the image element. The linking control is, for example, a command button control with an on-click event set to cause navigation to the determined network address. The command button control is preferably set to be rendered as transparent, but alternately can be semi-transparent or opaque or contain an icon or text. The linking control can be rendered either over the entire image element or alternately over just a portion of the image element corresponding to the barcode or other machine-readable code.

Alternately, if a plurality of barcodes or machine-readable codes are determined to be present in the image element, a plurality of separate linking control elements can be rendered corresponding to each bar code or machine readable code. In this way, the image area corresponding to a barcode or other machine-readable code can be highlighted to render the image area more visible or attention-getting to a user. Such highlighting can include for example coloring, borders, or temporal modification such as blinking. Different image areas can be highlighted in the same, or different, ways.

In an embodiment of the present disclosure, as described above, the information encoded by the barcode or other machine-readable code is a URL referencing information stored in a network-connected information-storage device. The linked information is presented to a user when the image area corresponding to the barcode or other machine-readable code is selected, for example on a display.

Figure 7:
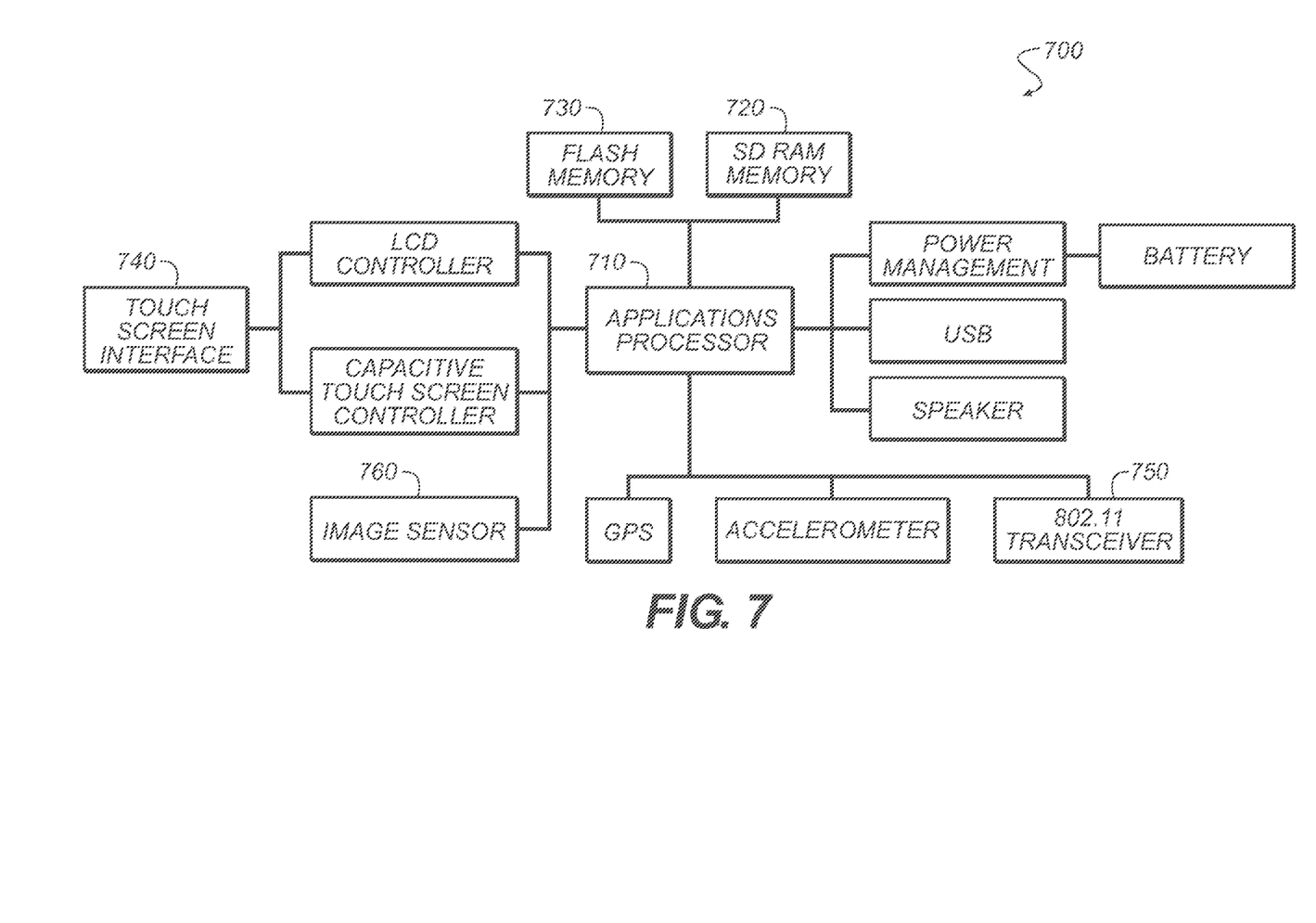
FIG. 7 is a block diagram illustrating an electronic computing device useful in implementing the present disclosure.

The present disclosure involves process steps which are intended to be executed on a computer device. One or more of the process steps of the present disclosure can be implemented as software instructions executed by a computer processor. One or more computer processors can be used. Examples of such computer devices include personal computers, lap tops, tablet computers, mobile smart phone devices, personal digital assistants, and the like. A block diagram of the components of an exemplary computer device 700 useful in practicing the present disclosure is shown in FIG. 7. Computer device 700 includes a processor 710 which will be understood by those skilled in the art to include one, two, or more separate processors. The processor 710 can be a single microprocessor integrated circuit or a plurality of integrated circuits connected together to execute the processing of software instructions. Computer device 700 further includes a random-access-memory 720 (RAM) used by the processor for short-term storage of data and software instructions to be executed. Computer device 700 further includes a non-volatile storage memory 730 such as Flash Memory or magnetic memory or the like for long-term data or program storage.

Computer device 700 further includes an electronic display 740 which is selected from a Liquid Crystal Display (LCD) type, an Organic Light Emitting Diode (OLED) type, or the like. The electronic display 740 is useful in presenting a graphic user interface and in rendering electronic document files.

Computer device 700 is further constructed to receive user input, in this example by way of a touch-screen element coupled to the Liquid Crystal Display. Computer device 700 further includes an interface for communication over a computer network, such as an 802.11 wireless network interface 750 or the like. Cellular communication interfaces can also be used.

Computer device 700 also preferably includes an image sensor 760, such as a CMOS-type image sensor for capturing digital image data. The image sensor 760 can have integrated processing on a single integrated circuit or, alternately, a separate integrated circuit for processing the sensor data can be provided. Other sensors such as accelerometers and GPS signal sensors are also preferably included. Other components including a universal serial bus interface, an audio speaker output, a power-management circuit and battery-power source, are also preferably included. Additional components (not shown) can also be included.

The present disclosure provides the advantage that information referenced by images that include machine-readable optical codes can be presented to a user at the user's discretion. Furthermore, information referenced by images scanned from hard copy, for example prints on photographic paper, can be accessed. Existing browser interfaces provide pre-defined hyperlinks that are not accessible to users working with, for example, scanned images from printed images. Digital images that include machine-readable codes, for example images taken with mobile cellular telephones incorporating cameras can access information referenced by the machine-readable codes but the information is not accessible in browsers or once the digital image is stored. In contrast, the present disclosure provides a way for users to access information referenced by machine-readable optical codes within a stored digital image and accessible through a browser. Since browsers are ubiquitous tools for accessing information on the internet, such accessibility is a useful feature of the present disclosure.

QR codes have been employed for illustrative purposes in the examples described herein; however the present disclosure can also be applied to other two-dimensional machine readable optical codes, one-dimensional machine-readable optical codes, or other machine-readable optical codes.

The disclosure has been described in detail with particular reference to certain preferred embodiments thereof, but it will be understood that variations and modifications can be effected within the spirit and scope of the disclosure.

PARTS LIST

- 100 Process
- 110 Step
- 120 Step
- 130 Decision Block
- 140 Decision Block
- 150 Decision Block
- 160 Step
- 170 Decision Block
- 180 Step
- 190 Step
- 311 Navigate Back Button
- 312 Navigate Forward Button
- 313 Cancel Document Load Button
- 314 Refresh Document Button
- 320 Address Input Block
- 400 Rendering
- 410 Rendered Image
- 420 Rendered Image
- 500 Process
- 510 Step
- 520 Step
- 530 Step
- 540 Decision Block
- 550 Decision Block
- 560 Decision Block
- 570 Step
- 700 Computer Device
- 710 Processor
- 720 Random Access Memory
- 730 Non-Volatile Storage memory
- 740 Electronic Display
- 750 Wireless Network Interface
- 760 Image Sensor

What is claimed is:

1. A method comprising:
    parsing, using a processing system, an electronic document to find an image element;
    analyzing, using the processing system, the found image element to determine if the found image element contains machine-readable optical code;
    presenting, on a graphical interface, an option to select the machine-readable optical code if the found image element contains the machine-readable optical code;
    decoding, using the processor, the selected machine-readable optical code; and
    presenting information referenced by the decoded information on the graphical interface.

2. The method of claim 1, wherein the decoded information is a uniform resource locator (URL) and wherein the graphical interface presents the information identified by the URL.

3. The method of claim 2, wherein the graphical interface includes a web browser interface and wherein the information presented on the display is a web-page corresponding to the URL.

4. The method of claim 1, wherein the decoded information is a computer network address.

5. The method of claim 1, wherein the graphical interface visually renders the image or the decoded information in a web browser interface.

6. The method of claim 1, wherein the machine-readable optical code is a one-dimensional code, a two-dimensional code, a matrix code, a barcode, or a QR code.

7. The method of claim 1, wherein the image includes a second machine-readable optical codes and further including using the graphical user interface to receive a user selection of the second machine-readable optical code, using the first or second processor to decode the selected second machine-readable optical code, and using the graphic user interface to present the decoded information on the display.

8. The method of claim 1, further including providing a linking element corresponding to the machine-readable optical code in the image provided to the user and receiving a selection of the linking element in the graphical user interface.

9. A system comprising:
- a processor configured to parse an electronic document to find an image element, analyze the found image element to determine if the found image element contains machine-readable optical code and, if the found image element contains the machine-readable optical code, present on a graphical interface an option to select the machine-readable optical code;
- a decoder configured to decode the selected machine-readable optical code; and
- a display configured to present information referenced by the decoded information on the display.

10. The system of claim 9, wherein the decoded information is a uniform resource locator (URL), the processor retrieves information referenced by the URL, and the graphic user interface presents the referenced information identified by the URL.

11. The system of claim 9, wherein the decoded information is a computer network address.

12. The system of claim 9, wherein the graphic interface includes a web browser interface and wherein the information presented on the display is a web-page corresponding to the URL.

13. The system of claim 9, wherein the machine-readable optical code is a one-dimensional code, a two-dimensional code, a matrix code, a barcode, or a QR code.

14. The system of claim 9, wherein the processor is further configured to provide a linking element corresponding to the machine-readable optical code in the image and to receive a selection of the linking element in the graphical interface.

15. A tangible computer readable medium having instructions stored thereon, the instructions comprising:
- instructions for parsing an electronic document to find an image element;
- instructions for analyzing the found image element to determine if the found image element contains machine-readable optical code;
- instructions for presenting, on a graphical interface, an option to select the machine-readable optical code if the found image element contains the machine-readable optical code;
- instructions for decoding the selected machine-readable optical code; and
- instructions for presenting information referenced by the decoded information on the graphical interface.

16. The computer readable medium of claim 15, wherein the decoded information is a uniform resource locator (URL) and wherein the graphical interface presents the information identified by the URL.

17. The computer readable medium of claim 15, wherein the decoded information is a computer network address.

18. The computer readable medium of claim 15, wherein the graphical interface includes a web browser interface and wherein the information presented on the display is a web-page corresponding to the URL.

19. The computer readable medium of claim 15, wherein the graphical interface visually renders the image or the decoded information in a web browser interface.

20. The computer readable medium of claim 15, wherein the machine-readable optical code is a one-dimensional code, a two-dimensional code, a matrix code, a barcode, or a QR code.

* * * * *